3,006,066
METHOD OF MAKING AN ELECTRICAL
PRECIPITATOR COLLECTOR SECTION
Harry W. Grossen, Chicago, and Robert H. Rayfield, Hinsdale, Ill., assignors to Borg-Warner Corporation, Chicago, Ill., a corporation of Illinois
Filed Aug. 15, 1957, Ser. No. 678,458
5 Claims. (Cl. 29—421)

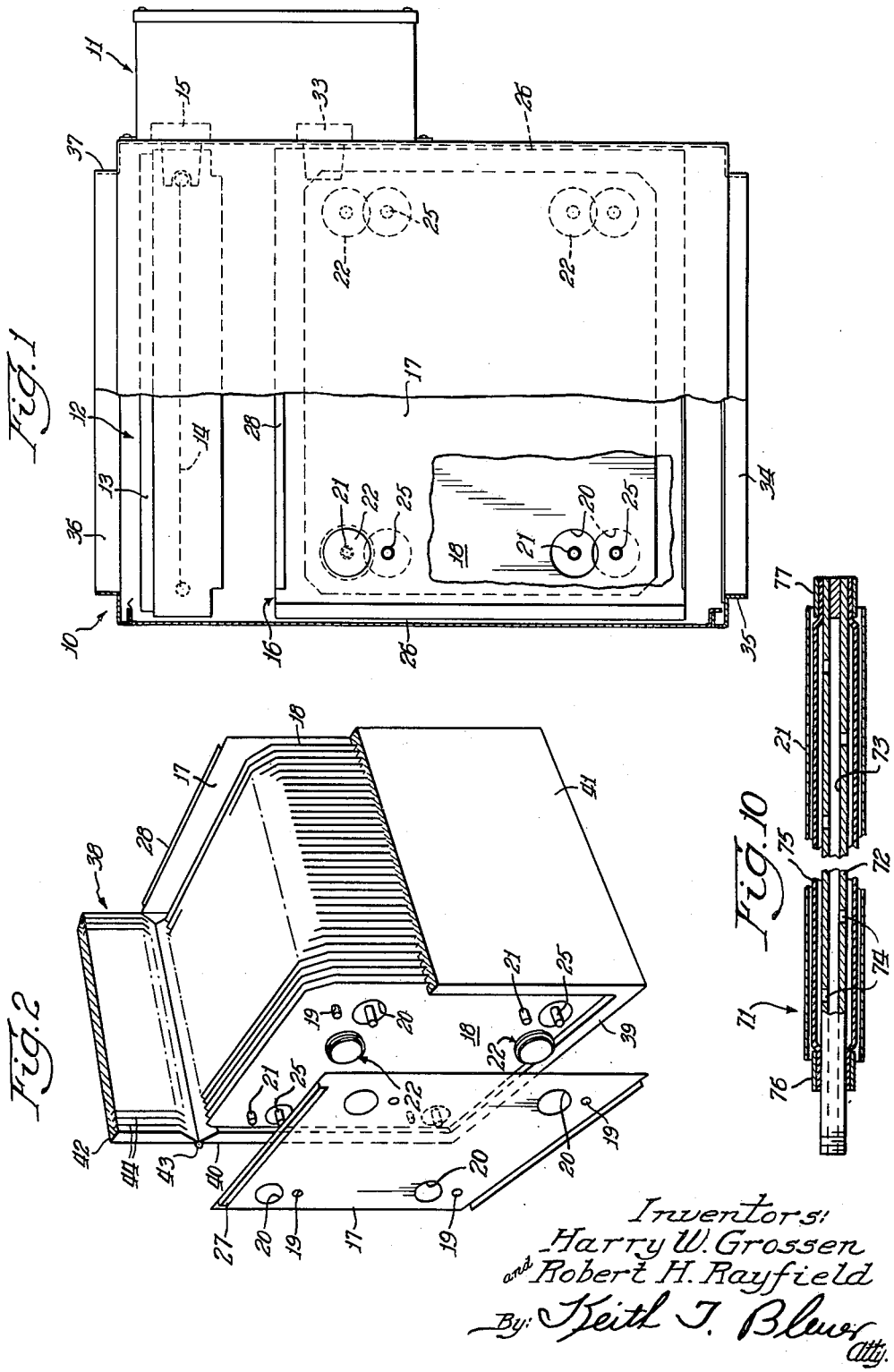

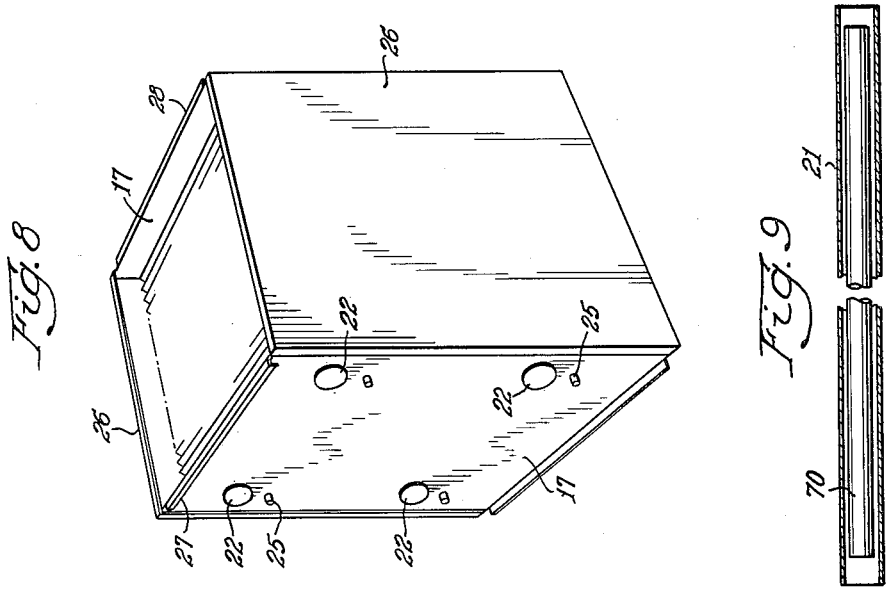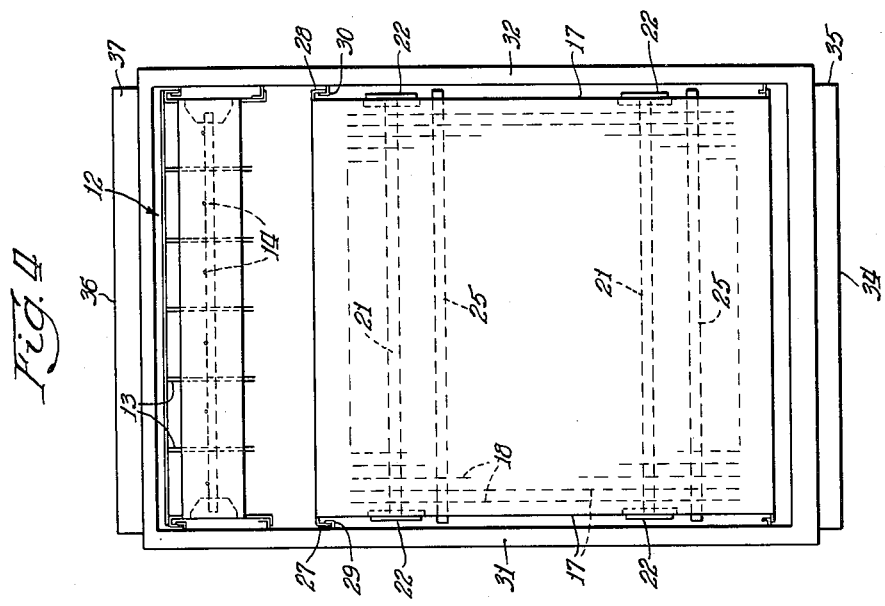

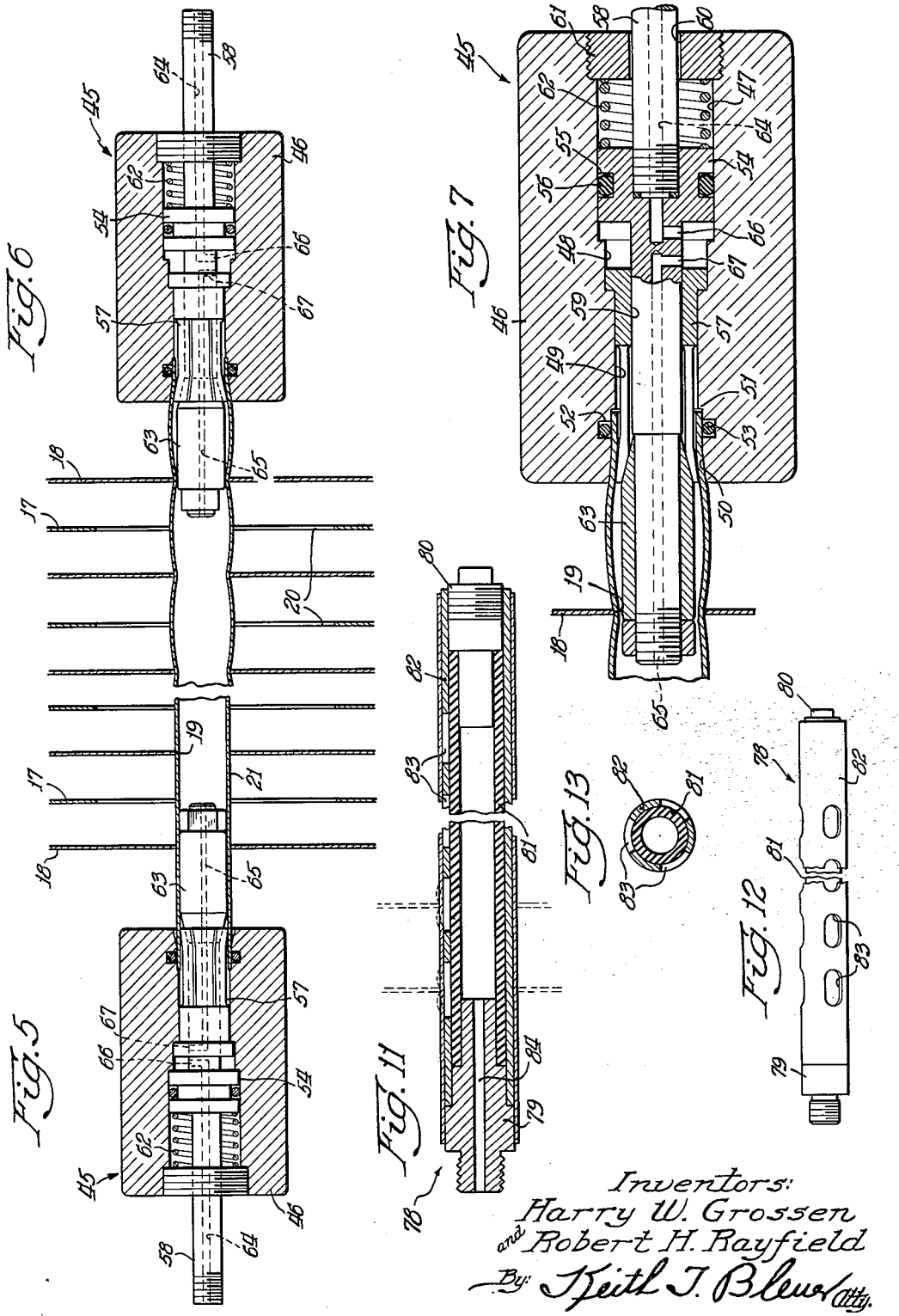

This invention relates to electrostatic precipitators and in particular to a method for manufacturing the collector section for such precipitators.

Collector sections with alternately spaced positive and negative plates for electrical precipitators have been manufactured by various methods of assembling the positive and negative plates by placing spacers between the plates at various points as the plates are being assembled. This placing of spacers between the multiplicity of plates as the collector section is being assembled is time consuming and therefore costly and also results in a larger area of obstruction to the passage of air between the plates when the precipitator is being used.

It is therefore an object of this invention to provide an improved method of economical manufacture of collector sections for electrical precipitators.

Another object is to provide a method of manufacturing and assembling collector sections for electrical precipitators in which a substantial saving in time of assembly is effected over prior practice.

Still another object is to provide a method of anchoring the plates of the collector section in spaced relationship to each other, adapted to be carried out mechanically instead of manually.

It is still another object to produce a light, sturdily constructed collector section that will stand up under handling when removed from the precipitator cabinet.

It is a more specific object of the invention to provide a collector section having alternate positive and negative plates held fixed wtih respect to each other by means of hollow tubes which are expanded in order to hold the plates together. It is an object to provide improved connecting devices for the ends of the tubes by means of which fluid pressure may be applied within the tubes in order to expand them. It is a more particular object to provide such an improved connecting device utilizing the fluid pressure in order to provide a fluid tight seal between the connecting device and the tube end and which is so constructed to insure that such a seal is provided before fluid under pressure is provided within the tube.

The invention consists of the novel methods, arrangements and devices to be hereinafter described and claimed for carrying out the above stated objects and other objects as will be apparent from the following description of a preferred manner of exercising the invention, illustrated with reference to the accompanying drawings, wherein:

FIG. 1 is a side view of an electrical precipitator, showing in part, some of the component parts thereof including a collector section;

FIG. 2 is a schematic perspective view of component parts of the collector section, partially assembled in a partially shown fixture;

FIG. 3 is a cross section of an insulator for use in the collector section;

FIG. 4 is a front open end view of the electrical precipitator;

FIG. 5 is a partial, cross-sectional view of the collector section, showing a connecting device for a source of fluid pressure connected to a plate holding tube of the collector section without presure being applied;

FIG. 6 is a partial cross-sectional view of the collector section showing the connecting device shown in FIG. 5 connected to a plate holding tube with fluid pressure being applied for expanding the tube;

FIG. 7 is a view on an enlarged scale of the connecting device shown in FIGS. 5 and 6;

FIG. 8 is a perspective view of the collector section;

FIG. 9 is a longitudinal cross sectional of a rod inserted into a collector section plate holding tube.

FIG. 10 is a longitudinal cross sectional view of the holding tube expanding device positioned within the plate holding tube;

FIG. 11 is a longitudinal cross sectional view of an alternate plate holding tube expanding mechanism and comprising a cage in the tube;

FIG. 12 is a view of the cage of the mechanism shown in FIG. 11; and

FIG. 13 is a cross sectional view taken on line 13—13 in FIG. 11.

Like characters of reference designate like parts in the several views.

Referring now to the drawings, the illustrated precipitator includes a cabinet 10 with a power supply assembly 11 attached to the back thereof and a charging section 12 mounted in the upper portion of the cabinet 10. The charging section 12 includes negative plates 13 and charging wires 14 disposed between the negative plates 13. An electrical contactor 15 connected to the assembly 11 for making an electrical connection with the charging wires 14 is mounted on the back of the cabinet 10.

Referring now in particular to FIG. 4, the cabinet 10 has a collector section 16 disposed in the lower portion thereof. The collector section 16 comprises a series of alternate, spaced negative and positive collector plates 17 and 18, each of which is provided with four small and four large openings 19 and 20 therein. It should be noted that the positive plates 18 are identical with the negative plates 17 except that the positive plates 18 are turned 180° with respect to the negative plates. The positive collector plates 18 are fastened and held in spaced relationship to each other by means of four positive plate holding tubes 21. The positive plate holding tubes 21 are mounted at both ends by insulators 22. The insulators 22 have cylindrical recesses 23 in one side for receiving the positive plate holding tubes 21 and bosses 24 on the other side for insertion into the large holes 20 of the end negative plates 17 of the collector section 16. The negative plates 17 are held fixed in spaced relation to each other by means of negative plate holding tubes 25.

Side panels 26 connect together the two end negative collector plates 17, so that the side panels 26 and the end negative collector plates 17 form an open-ended receptacle, which is disposed within the cabinet 10.

The collector section 16 is slidably mounted within the cabinet 10 of the precipitator. The slidable mounting may be by means of a pair of downwardly depending rails 27 and 28 fixed to the upper edges of the end negative collector plates 17 of the collector section 16 and receiving angle members 29 and 30 which are attached to side panels 31 and 32 respectively of the precipitating cabinet 10.

Referring back to FIG. 1, an electrical contact 33 connected to a power supply assembly 11 for making an electrical connection with the positive plates 18 is mounted on the back of the cabinet 10.

The precipitator is particularly adapted to be used in a hot air home furnace and may be connected into the air return duct of such a furnace. The cabinet 10 is provided with an open end air outlet 34 bordered by a flange 35 and has an opposite open end air inlet 36 bordered by a flange 37. Flanges 35 and 37 can be used for attaching the precipitator into the furnace return duct.

Referring now to FIG. 2 a fixture 38 with various collector section components assembled therein is shown. The fixture 38 comprises a bottom portion 39, two end portions 40 and 41 and a top portion 42. The top portion 42 is normally co-extensive with the bottom portion 39 and is pivotally attached to the end portion 40 by means of a hinge 43. The inside faces of the bottom portion 39, the end portions 40 and 41 and the top portion 42 are provided with grooves 44.

Referring now to FIGS. 5 and 6, a connector device 45 is shown for supplying fluid under pressure to the tubes 21 and 25. The connector device 45 comprises a casing portion 46 having stepped bores 47, 48 and 49. Bore 49 has an enlarged flared portion 50, a shoulder 51 and a groove 52 carrying a sealing ring 53. A piston 54 is slidably disposed within the bore 47 and has an extension comprising successively reduce diameter portions 54a and 54b. The piston is provided with a groove 55 and a sealing ring 56 disposed therein for sealing the piston in the bore 47. A split collet 57 is fixed in its illustrated position within the bores 48 and 49. A fluid pressure supply tube 58 is threaded into the piston 54 and moves along with the piston. The piston portion 54a is slidably disposed in an opening 59 in the collet 57, and the supply tube 58 extends loosely through the opening 60 in a threaded part 61 in one end of the casing 46. A spring 62 is biased between the piston 54 and the threaded part 61.

A sleeve 63 is disposed on the piston portion 54b and is fixed thereon by means of a nut 54c. The sleeve 63 is provided with a tapered end acting as a cam portion coacting with the collet 57. The tube 58 and the piston 54 are provided with a fluid inlet passage therethrough, and the piston 54 is provided with an outlet passage 65. The inlet passage 64 and the outlet passage 65 are communicatable with the bores 47 and 48 by means of ports 66 and 67 respectively. A tube 21 is shown in FIGS. 6 and 7 inserted into one end of the casing 46 so as to abut the shoulder 51, and the tube has restricted portions 68 fitting tightly in the openings 19 of the plates 18 and has expanded portions disposed in the holes 20 of the plates 17.

In FIG. 9 a solid rod 70 is shown inserted into a plate holding tube 21.

In FIG. 10 a plate holding tube expanding mechanism 71 is shown inserted into a plate holding tube 21. The mechanism 71 comprises a rod 72 attachable at one end to a source of fluid pressure and having a passage 73 and ports 74 therein, and an expansible bladder 75 surrounding the rod 72. The bladder 75 is sealed at both ends to the rod 72 by clamps 76 and 77.

In FIG. 11 an alternate plate holding tube expanding mechanism 78 is shown inserted into a plate holding tube. The expanding mechanism 78 comprises an end portion 79 attachable to a source of fluid pressure and a closed end portion 80. A bladder 81 is attached to portion 79 at one end and to the portion 80 at the other end. A cage 82 having slots 83 encompasses the bladder 81 and is fixed at its ends to portions 79 and 80. A passage 84 communicating with the bladder 81 is provided in portion 79.

When the precipitator is connected into a duct of a furnace and put in operation, the air passes through the charging section 12 between the negative plates 13 and around the charging wires 14 so that the dust particles in the air are ionized. After thus being ionized, the particles move with the air current into the collector section 16 between the plates 17 and 18 and due to the ionization of the dust particles they are collected on the plates 17 and 18 depending on the charge on each of the particles.

The collector section 16 may be removed from the precipitator cabinet 10 by virtue of being slidably mounted by means of rails 27 and 28 coacting with the receiving angle members 29 and 30. When the collector section 16 is removed from the cabinet 10, the electrical connection with the contactor 33 is automatically broken, and conversely when the collector section 16 is replaced in the cabinet 10 and electrical connection is automatically made with the contactor 33.

In the manufacture of the collector section 16 the open-ended fixture 38 is used. The fixture 38 is of a size so that the negative and positive plates 17 and 18 may be slid into the grooves 44 when the top portion 42 is opened. The negative and positive plates 17 and 18 are so stacked in the fixture that the plates in the first and the last grooves are positive plates 18. The negative and positive plates 17 and 18 when stacked in the fixture 38 are so placed that the small holes 19 and the large holes 20 are on identical centers and alternate. When the plates have been stacked, as stated above, the top portion 42 of the fixture 38 is then closed, the grooves 44 in the top portion 42 fitting over the ends of the negative and positive plates 17 and 18 thus holding them firmly in spaced relationship to each other. The positive plate holding tubes 21 and the negative plate holding tubes 25 are passed through the assembled plates at the small holes 19 and the large holes 20, respectively, in the faces of the outermost of the assembled plates.

Two connector devices 45 connectible to a source of fluid pressure are used to expand the positive and negative plate holding tubes 21 and 25 for the purpose of fixing the positive plates 18 and the negative plates 17 to the positive holding tubes 21 and the negative holding tubes 25 respectively. In accomplishing this, one of the connector devices 45 is connected to one end of one of the tubes and another connector device 45 is connected to the other end of the tube. Pressure is then introduced into the tube from the pressure source through the two connector devices 45 whereby the tube is expanded and bound to the plates in the peripheries of the small holes 19.

Before expanding the positive and negative plate holding tubes 21 and 25, a rod 70 (see FIG. 9) may be inserted into all of the plate holding tubes for reducing the void within the tubes whereby a smaller amount of fluid is needed to expand the plate holding tubes.

It should be noted that there is a certain amount of entrained air within the plate holding tubes in this method of expanding them, and therefore the insertion of a rod 70 into each of the tubes will also reduce the amount of entrained air to be compressed, which will speed up the expanding operation.

The small holes 19 in the plates inhibit the expansion of each of the tubes at the areas of the small holes 19, whereby expansion of the tubes in excess of the diameter of the small holes 19 occurs only in those portions of the tube not restricted which results in alternately restricted and expanded portions 68 and 69 respectively. The plates are thus held captive at the small holes by the expanded portions 69. The remainder of the tubes are similarly expanded so that all the negative plates 17 are fixed to the negative plate holding tubes 25 and all the positive plates 18 are fixed to the positive plate holding tubes 21 whereby the negative plates 17 and positive plates 18 are isolated with respect to each other, because the arrangement of the large holes 20, with respect to the negative and positive plate holding tubes 25 and 21 is such that the edges of the large holes 20 in the positive plates 18 do not contact the negative plate holding tubes 25; and the edges of the large holes 20 in the negative plates 17 do not contact the positive plate holding tubes 21. The fixture 38 containing the assembled plates is then upended so as to remove by gravity the rods 70, if used, and fluid remaining in the plate holding tubes as a result of the expanding process.

Continuing with the assembling, insulators 22 are assembled by inserting the bosses 24 in the large holes at the inner faces of two negative plates 17 which have not been stacked in the fixture 38. Then these two negative plates 17 are assembled to each side of the stacked plates in the fixture 38 so that the positive plate holding tubes 21 fit into the cylindrical recesses 23 of the insulators 22; and the negative plate holding tubes 25 are inserted through the small holes 19 of these two negative plates 17. The holding tubes 25 are then secured in the small holes 19 of these two end negative plates 17 by flaring the tube ends whereby an integral structure of alternately spaced negative and positive plates is formed which may be lifted from the fixture 38.

Two side panels 26 are then attached to the ends of the outermost negative plates 17 thereby completing a rigidly constructed open ended collector section.

Specifically, with respect to the operation of the connector devices 45, on the holding tubes 21 or 25, one of the devices 45 is slipped on each end of one of the tubes so that the tube enters the flared portions 50 of the bores 49 and is stopped by the shoulders 51 thereby making a sealed connection between the tube and the connector devices 45 by virtue of the sealing rings 53 which engage the outer periphery of the tube.

When fluid pressure is introduced through the passages 64 of the two devices 45, the fluid passes through the port 66 of each device 45 into bore 48, building up pressure which acts against the face of the piston 54. This pressure moves the piston against the bias of the spring 62, thereby causing the sleeve 63 to expand the collet 57, whereby the tube is expanded into the flared portion 50 of the bore 49 to effect a grip on the tube between the collet 57 and the flared portion 50. Subsequent pressure buildup in the tube thus is ineffective from disconnecting the connector device 45 from the tube. When the pressure introduced into the bore 48 has moved the piston 54 far enough against the bias of the spring 62, the port 67 is exposed to the bore 48 thereby permitting the fluid pressure to enter the outlet passage 65 to introduce pressure into the tube and expand the same. After the tube has been expanded, the fluid pressure is cut off and under the urging of the spring 62, the piston 54 is moved so as to disengage the sleeve 63 from the collet 57 and thereby permit the collet 57 to return to its original smaller diameter or neutral condition and permit the connector device 45 to be readily removed from the expanded tube.

It should be noted that the extreme end of the tube retains its original diameter since it is not subjected to internal pressure by either the collet or the fluid; however, expansion of the tube occurs in the flared portion 50 of the bore 49 as a result of the expansion of the collet 57 under the influence of the sleeve 63, thereby producing a tapered portion at the end of the tube which serves as a stop for the outermost negative plates 17 when assembled over the ends of the negative plate holding tubes 25 as heretofore described.

Other methods of expanding the plate holding tubes may be employed such as by means of mechanisms 71 or 78.

In operation, either of these mechanisms 71 or 78 may be inserted into the plate holding tube to be expanded.

First, with respect to mechanism 71, which, when connected to a source of fluid pressure and pressure is introduced through the passage 73, fluid under pressure passes through ports 74 and expands the bladder 75 which in turn causes the plate holding tube to expand and be secured in the small holes of the plates. By this method no fluid is lost since it is not introduced directly into the plate holding tubes.

Similarly, no fluid is lost when using mechanism 78 for expanding the plate holding tubes. In operation this mechanism 78 is also similar in other respects to mechanism 71, the difference being that the bladder can expand only at the slots 83 within the small openings 19 of the plates to be secured to the tubes, therefore limiting the expansion of the plate holding tube to that area.

My improved fluid pressure connecting device 45 advantageously makes a fluid tight connection with one of the plate holding tubes 21 and 25 by means of the fluid pressure applied to the connecting device, with the piston 54 and the sleeve 63 being moved by fluid pressure to grip the tube between the expandable collet 57 and the casing of the device 45. The device 45 is advantageously so constructed that no fluid pressure flows into the tube until such a fluid tight connection has been made. The expandable bladder devices shown in FIGS. 10 and 11 advantageously do not permit contact of the fluid directly on the interior surface of the tube.

We wish it to be understood that our invention is not to be limited to the specific constructions and methods shown and described, except only insofar as the claims may be so limited, as it will be understood to those skilled in the art that changes may be made without departing from the principles of the invention.

We claim:

1. In a method for making an electrical precipitator collector section having a plurality of positive plates alternately stacked with a plurality of negative plates, the steps which comprise forming the said plates each with a pair of spaced holes on identical centers in said plates, the said positive plates having large and small holes respectively on the said centers and the said negative plates having respective small and large holes on the said centers, stacking a number of the said plates in a holding fixture in such manner so that positive and negative plates alternate and provide positive plates at each end, then inserting a pair of tubes through the aligned holes in said stacked plates, expanding the said tubes so that they bind with the peripheries of the said small holes in the stacked said plates, assembling one of a pair of end negative plates on each side of the said stacked plates with the said tubes that are bound to the assembled negative plates passing through the said small holes in the said pair of negative plates and with insulators between said assembled plates and the said pair of end negative plates, the said insulators being mounted with respect to the said large holes in the said pair of end negative plates and the ends of the said tubes that are bound to the said positive plates, fastening the said tubes that pass through the said pair of end negative plates to the said pair of end negative plates thereby forming a complete assembly in which the said positive and negative plates are permanently held in spaced relation and removing said completed assembly from the said holding fixture.

2. In a method for making an electrical precipitator collector section having a plurality of positive plates alternately stacked with a plurality of negative plates, the steps which comprise forming the said plates with four pairs of large and small spaced holes on identical centers in the said plates, the said positive plates having the said large and small holes respectively on the said centers and the said negative plates having small and large holes respectively on the said centers, stacking a number of the said plates in a holding fixture in such manner so that positve and negative plates alternate and provide positive plates at each end, inserting tubes in the aligned holes in the said plates, expanding the said tubes so that they bind with the peripheries of the said small holes in the said stacked plates, providing a plurality of insulators with bosses on one side of a diameter to fit the said large holes and cylindrical recesses in the other side of a diameter to fit over the ends of said tubes, inserting the bosses of the said insulators in the large holes of a pair of unassembled end negative plates, assembling the said pair of end negative plates on each side of the said stacked plates with the said tubes that are bound to the said stacked negative plates passing through the said small holes in the said pair of end negative plates and with the said tubes that are bound to the said positive plates inserted into the cylindrical recesses in the said insulators, fastening the said tubes that pass through the said pair of end negative plates to the said pair of end negative plates thereby forming a complete assembly in which said positive and negative plates are permanently held in spaced relation and removing the said completed assembly from the said hold fixture.

3. In a method for making an electrical precipitator collector section having a plurality of positive plates alternately stacked with a plurality of negative plates, the steps which comprise forming the said plates with four pairs of relatively large and small spaced holes on identical centers in said plates, the said positive plates having the said large and small holes respectively on the said centers and the said negative plates having respectively small and large holes on the said centers, assembling the said plates in a holding fixture having means for holding the said plates spaced apart, inserting tubes in all the aligned holes in the said plates, inserting rods in all the said tubes to reduce the voids therein expanding each of the said tubes by applying fluid pressure simultaneously into the opposite ends of each of said tubes so that they bind in the peripheries of the said small holes in the said plates, and thereafter upending the said holding fixture containing the said assembled plates for removing the said rods and fluid if any resulting from the said expanding process.

4. In a method for making a collector section for an electrical precipitator the steps which comprise, providing a plurality of plates having two sets of holes therein, the first set being of equal diameter but smaller than the second set, the said holes being so arranged in the said plates so that the said plates may be stacked in a spaced-apart relationship wherein the said first set of holes in the said plates will alternate with the said second set of holes and align therewith, providing two sets of tubes of equal diameter the first set of said tubes being shorter than the second set of said tubes, the tubes in each set being of equal length, providing a plurality of insulators with bosses on one side of a diameter to fit the said second set of holes and cylindrical recesses in the other side of the said insulators of a diameter to receive the ends of the said tubes, assembling an odd number of the said plates so that the said two sets of holes will be in alignment and alternate with respect to size, inserting a number of the said first and second sets of tubes through the said assembled plates at the said second and first sets of holes respectively in the outermost of the said assembled plates, the said tubes being of a length to extend beyond the faces of the outermost said plates, inserting rods in the said tubes to reduce the entrained air therein, expanding the said tubes by introducing fluid pressure therein until the said tubes are fastened firmly in the peripheries of the said first set of holes of the assembled plates, removing the said rods, assembling insulators by means of their bosses in the second set of holes of a pair of said plates, fitting the said pair of plates over the ends of the said tubes which are fixed to the said assembled plates so that the said first set of tubes fits into the cylindrical recesses of the said insulators and the said second set of tubes extends through the said first set of holes in the said pair of plates, fastening the said second set of tubes that pass through the said first set of holes in the said pair of plates to the said pair of plates thereby forming a complete assembly in which the said positive and negative plates are permanently held in spaced relation, removing said assembly from said fixture, and attaching panels to the ends of the said pair of plates, thereby completing an open-ended collector section.

5. In a method for making a collector section for an electrical precipitator, the steps which comprise providing a plurality of positive and negative plates with relatively large and small holes therein, the said large and small holes of the positive plates being on identical centers respectively with the said small and large holes of the negative plates, providing a plurality of two sets of tubes comprising one set of equal length relatively short tubes and one set of equal length relatively long tubes and of a diameter to fit the said small holes, providing a plurality of insulators with bosses on one side of a diameter to fit the said large holes and cylindrical recesses in the other side of the said insulators of a diameter to fit over the ends of the said tubes, assembling an odd number of the said plates in a holding fixture in such manner so that positive and negative plates alternate and provide positive plates at the ends, with the holes in the said assembled plates on identical centers and alternating with respect to size, inserting the said long and the short tubes through the said assembled plates at the said large and small holes respectively in the outermost of the said assembled plates the said tubes being of a length to extend beyond the faces of the said outermost plates, inserting rods in the said tubes to reduce the entrained air therein, expanding the said tubes by introducing fluid pressure into the said tubes until the said tubes are fixed firmly in the peripheries of said small holes of the said assembled plates, upending the said holding fixture containing the said assembled plates to thereby remove the said rods and fluid, if any, resulting from the said expanding process, assembling insulators by means of their bosses in the large holes of a pair of said plates, fitting the said pair of plates over the ends of the said tubes so that the said short tubes fit into the cylindrical recesses of the said insulators and the long said tubes extend through the said small holes in the said pair of plates, fastening the said long tubes that pass through the said small holes in the said pair of plates to the said pair of plates thereby forming a complete assembly in which the said positive and negative plates are permanently held in spaced relation, and removing the said complete assembly from the said fixture.

References Cited in the file of this patent

UNITED STATES PATENTS

| 228,161 | Adlam | June 1, 1880 |
| 605,195 | Birtwisle | June 7, 1898 |
| 633,430 | Crowden | Sept. 18, 1899 |
| 1,725,286 | Loughead | Aug. 20, 1929 |
| 1,779,489 | Peirce | Oct. 28, 1930 |
| 1,822,037 | Kerschner | Sept. 8, 1931 |
| 2,189,652 | Lehman | Feb. 6, 1940 |
| 2,459,316 | Gramelspacher | Jan. 18, 1949 |
| 2,462,511 | Kramer | Feb. 22, 1949 |
| 2,487,257 | Morgan | Nov. 8, 1949 |
| 2,576,085 | Vivian | Nov. 20, 1951 |
| 2,676,238 | Coates | Apr. 20, 1954 |
| 2,747,258 | Kramer | May 29, 1956 |